(12) United States Patent
Kutubuddin et al.

(10) Patent No.: US 11,976,213 B2
(45) Date of Patent: May 7, 2024

(54) HIGHLY REFLECTIVE RESINOUS COATINGS

(71) Applicant: LATICRETE INTERNATIONAL, INC., Bethany, CT (US)

(72) Inventors: Ayaz Kutubuddin, Forney, TX (US); Brandon Serraile, Aubrey, TX (US); Eerik Maandi, Rocky Hill, CT (US); Ben Lampi, Cheshire, CT (US); Aaron Hogan, Bethany, CT (US)

(73) Assignee: Laticrete International, Inc., Bethany, CT (US)

( * ) Notice: Subject to any disclaimer, the term of this patent is extended or adjusted under 35 U.S.C. 154(b) by 324 days.

(21) Appl. No.: 17/513,721

(22) Filed: Oct. 28, 2021

(65) Prior Publication Data
US 2022/0127465 A1    Apr. 28, 2022

Related U.S. Application Data

(60) Provisional application No. 63/106,549, filed on Oct. 28, 2020.

(51) Int. Cl.
*C09D 5/00* (2006.01)
*A01G 7/04* (2006.01)
*A01G 9/14* (2006.01)
*A01G 9/24* (2006.01)
*C09D 5/33* (2006.01)
*C09D 7/40* (2018.01)
(Continued)

(52) U.S. Cl.
CPC ............ *C09D 5/004* (2013.01); *A01G 9/14* (2013.01); *A01G 9/249* (2019.05); *C09D 7/45* (2018.01); *C09D 7/61* (2018.01); *C09D 7/69* (2018.01); *C09D 7/70* (2018.01); *C09D 7/80* (2018.01); *C09D 163/00* (2013.01); *C09D 177/04* (2013.01)

(58) Field of Classification Search
CPC ...... C09D 163/00; C09D 5/004; A01G 7/045; A01G 9/249; A01G 9/24; A01G 9/14
See application file for complete search history.

(56) References Cited

U.S. PATENT DOCUMENTS

| 8,734,940 B2 | 5/2014 | Teather et al. | |
| 2003/0005626 A1* | 1/2003 | Yoneda | A01G 9/246 47/69 |

(Continued)

FOREIGN PATENT DOCUMENTS

| CN | 109401518 A | * 3/2019 | ........... C09D 157/02 |
| CN | 111040538 A | * 4/2020 | ........... C09D 133/04 |

*Primary Examiner* — Monica L Perry
(74) *Attorney, Agent, or Firm* — DeLio Peterson & Curcio LLC; Kelly M Nowak

(57) ABSTRACT

Methods and high visible-light reflective reactive resinous coatings that increase visible light inside a grow house and enhance plant growth therein. A pre-dispersion of a resin, zinc oxide, one or more fillers, and retroreflective microspheres, is mixed with a one-part or two-part reactive coating system to provide a high-reflectance reactive resin coating composition. At least one or more layers of the high-reflectance reactive resin coating composition is coated onto a substrate inside the grow house and allowed to cure. The cured high-reflectance reactive resin layer has a light reflectance increase up to 60% in lumens increasing an amount of visible light inside the grow house to enhance plant growth.

20 Claims, 3 Drawing Sheets

(51) Int. Cl.
*C09D 7/45* (2018.01)
*C09D 7/61* (2018.01)
*C09D 7/80* (2018.01)
*C09D 163/00* (2006.01)
*C09D 177/04* (2006.01)

(56) References Cited

U.S. PATENT DOCUMENTS

| | | | |
|---|---|---|---|
| 2008/0148630 A1* | 6/2008 | Ryan | A01G 7/045 47/17 |
| 2016/0103255 A1* | 4/2016 | Powell | G02B 30/56 359/530 |
| 2021/0195851 A1* | 7/2021 | Okumura | D04B 1/16 |
| 2021/0351328 A1* | 11/2021 | Goto | H01L 33/62 |
| 2022/0030681 A1* | 1/2022 | Li | G02B 6/0055 |

* cited by examiner

HIGHLY REFLECTIVE RESINOUS COATINGS

BACKGROUND OF THE INVENTION

1. Field of the Invention

The present invention is directed to reflective coatings, and in particular, to high visible-light reflective reactive resinous coatings for concrete floorings, wall coatings, and architectural applications.

2. Description of Related Art

The cultivation of plant and plant-based products whether for food, industrial, medicinal, or recreational use is an energy and resource intensive process. The increased utilization of technology has seen the adoption of new growing practices including indoor and supplemented growing which aim to control all inputs of the growing cycle in order to increase yield and maximize outputs. The use of artificial lights either as a sole, primary, or supplemental source has allowed these operations to extend the growing season year-round. Operations that utilize artificial lighting require large amounts of energy to run. In 2017, the US horticultural market consumed 5.9 terawatt-hours (TWh) or $600 million of electricity for lighting purposes alone.

One such crop that has benefited from these advancements in growing practices is Cannabis. Indoor cannabis cultivation facilities or grow houses (hereinafter collectively referred to as "grow house"), are indoor farms for the production of plant-based consumer products (hereinafter referred to as "plant products") used for medicinal and recreational purposes. Cannabis cultivation requires long photoperiods ranging from 12-24 hours per day. Due to its high lighting demands, one of the largest cost expenditures is related to the facilities' energy consumption and associated lighting demands. It is estimated that in current grow houses, the amount of energy required to produce (1) pound of cannabis plant flower is between 1136 kWh to 3259 kWh2, which could cost anywhere from $80 to $500.

Approaches have been aimed at decreasing costs and increasing grow house profits. For instance, approaches have been at increasing sealing of grow spaces to prevent environmental contaminants (e.g., bacteria) from entering the grow houses, while others include the introduction of vertical growing systems to increase yield in small spaces, such as, growing cubes or hydroponic farming. Other approaches aim at decreasing greenhouse/grow house costs by reducing labor, streamlining product lines, and reducing energy consumption.

In reducing energy consumption, there are currently numerous energy conservation strategies used including reducing air leaks, managing temperatures based on crop and finish date, and using horizontal air flow fans. These methods may generate an energy consumption savings ranging from 40% to 60%. In combination with reducing energy consumption, growers have also been able to increase efficiency of energy use by installing one or more of high-efficiency heaters, energy or shade curtains, solar panels, insulated side and end walls, as well as replacing lighting fixtures with more energy-efficient alternatives (e.g., light-emitting diodes or IR). Computerized environmental control systems have also been implemented to control ventilation and heating conditions.

With the increased use of and demand for grow houses, further improvements are needed to reduce energy consumption, decrease costs, and increase plant product yields, for which the present invention provides solutions thereto.

SUMMARY OF THE INVENTION

Bearing in mind the problems and deficiencies of the prior art, it is therefore an object of the present invention to provide visible-light reflective reactive resinous coatings for construction applications.

Another object of the present invention is to provide visible-light reflective reactive floor and wall coatings for use in grow houses.

It is another object of the present invention to provide highly visible-light reflective reactive floor and wall coatings that reduce energy consumption, decrease costs, and increase plant product yields.

A further object of the invention is to provide methods of reducing energy consumption, decreasing costs, and increasing plant product yields by applying a highly visible-light reflective reactive resinous coating to floors and/or walls of a grow house.

Still other objects and advantages of the invention will in part be obvious and will in part be apparent from the specification.

The disclosed embodiments of the invention are directed to methods of increasing visible light in a grow house. The methods include providing a pre-dispersion composition comprising a resin, zinc oxide, one or more fillers, and retroreflective microspheres, and mixing the pre-dispersion composition with a reactive coating composition to provide a high-reflectance reactive resin coating composition. The high-reflectance reactive resin coating composition is deposited over a substrate inside the grow house and allowed to cure. Once cured, a cured high-reflectance reactive resin layer is formed that has a light reflectance increase up to 60% in lumens as compared to a cured layer of the reactive coating composition alone. The methods include reflecting light from a light source off the cured high-reflectance reactive resin layer to increase an amount of visible light inside the grow house.

In one or more embodiments, the pre-dispersion composition may comprise resin in an amount of 10-50 wt. %, zinc oxide in an amount of 20-50 wt. %, one or more fillers in an amount of 5-20 wt. % and retroreflective microspheres in an amount of 5-20 wt. %.

The high-reflectance reactive resin coating composition may comprise a total amount of resin comprising 40-89 wt. % resin, a total amount of zinc oxide comprising 5-20 wt. % zinc oxide, a total amount of one or more fillers comprising 1-20 wt. % one or more fillers and a total amount of retroreflective microspheres comprising 5-20 wt. % retroreflective microspheres, whereby the weight percentages are based on weight of resin solids in the cured high-reflectance reactive resin layer. In one or more preferred embodiments, the high-reflectance reactive resin coating composition comprises a total amount of resin comprising 75-85 wt. % resin, a total amount of zinc oxide comprising 5-10 wt. % zinc oxide, a total amount of one or more fillers comprising 5-10 wt. % one or more fillers and a total amount of retroreflective microspheres comprising 5-10 wt. % retroreflective microspheres.

In embodiments of the invention the high-reflectance reactive resin coating composition may further include one or more additives in a total amount of 0.5-1 wt. % additives. The resin may be an epoxy resin and the pre-dispersion composition may be an epoxy resin pre-dispersion, such that, the method includes mixing the epoxy resin pre-dispersion with the reactive coating composition comprising a clear or pigmented epoxy coating composition. The epoxy resin may have an epoxide equivalent weight (g/eq) higher than 20 and lower than 1150, an epoxide amount of 50 percent or less, and a viscosity of 14000 mPas or less.

In certain embodiments the resin may be a secondary diamine resin and the pre-dispersion composition comprises a secondary diamine resin pre-dispersion, such that, the method includes mixing the secondary diamine resin pre-dispersion with the reactive coating composition comprising a clear or pigmented polyaspartic coating composition. The secondary diamine resin may have an amine equivalent weight greater than 250 and less than 550, and a viscosity greater than 50 cPs and less than 1500 cPs.

In one or more embodiments, the retroreflective microspheres may be soda lime glass or barium titanate glass. The retroreflective microspheres may have a particle size ranging from about 3 microns to 100 microns. Further, the retroreflective microspheres may be treated with a surfactant.

In the various embodiments of the invention, the substrate inside the grow house may be a horizontal substrate surface, a vertical substrate surface, or both horizontal and vertical substrate surfaces. For instance, the substrate may be a flooring, a wall, a ceiling, or any combination thereof.

In other embodiments, the invention is directed to methods of increasing visible light in a grow house by providing a high-reflectance reactive resin coating composition and depositing it over a substrate inside the grow house. The high-reflectance reactive resin coating composition includes a total amount of resin comprising 40-89 wt. % resin, a total amount of zinc oxide comprising 5-20 wt. % zinc oxide, a total amount of one or more fillers comprising 1-20 wt. % one or more fillers, a total amount of retroreflective microspheres comprising 5-20 wt. % retroreflective microspheres, the weight percentages are based on weight of resin solids in the high-reflectance reactive resin coating composition. Once deposited, the high-reflectance reactive resin coating composition is allowed to cure to provide a cured high-reflectance reactive resin layer over the substrate. Light is reflected off the cured high-reflectance reactive resin layer from a light source to increase an amount of visible light at 400 nm-700 nm wavelengths inside the grow house.

The cured high-reflectance reactive resin layer may have a light reflectance increase of 60% in lumens inside the grow house. The high-reflectance reactive resin coating composition may be formulated by mixing a pre-dispersion including a resin, zinc oxide, one or more fillers, and retroreflective microspheres with a reactive resin coating composition. The pre-dispersion may include resin in an amount of 10-50 wt. %, zinc oxide in an amount of 20-50 wt. %, one or more fillers in an amount of 5-20 wt. % and retroreflective microspheres in an amount of 5-20 wt. %. The reactive resin coating composition may be a one-part or two-part reactive resin coating system.

In other aspects the invention is directed to a high-reflectance reactive resin coating composition for use inside a grow house. The coating composition includes a total amount of resin comprising 40-89 wt. % resin, a total amount of zinc oxide comprising 5-20 wt. % zinc oxide, a total amount of one or more fillers comprising 1-20 wt. % one or more fillers and a total amount of retroreflective microspheres comprising 5-20 wt. % retroreflective microspheres, whereby the weight percentages are based on weight of resin solids in the high-reflectance reactive resin coating composition. At least one or more layers of the high-reflectance reactive resin coating composition are coated onto a substrate and cured to form a cured high reflectance coating composition having a light reflectance increase up to 60% lumens increasing an amount of visible light inside the grow house to enhance plant growth

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-5 of the drawings in which like numerals refer to like features of the invention.

In the plant growth cycle within grow houses (greenhouses, etc.), lighting plays an important role. During plant growth and development through photosynthesis, plant pigment molecules absorb only visible light energy. While visible light is seen by humans as white light, it actually exists in a spectrum of light colors including blue, purple, green, yellow/white and red. For instance, blue light is critical during the plant's growth cycle as it is absorbed to produce chlorophyll and helps to ensure healthy roots and leaves, as well as strong stems. Less of the green light is absorbed by the plant as compared to other parts of the light spectrum, such that, plants appear green. Red light is important during the blooming or flowering stages.

While each of the color spectrums helps to produce healthy plants, different colors of light are more important at different stages of plant life growth cycle. Exposing plants to higher concentrations of certain types of light at different points in the plant growth cycle can produce strong quality plant products. For instance, as discussed above, blue light is very effective during the vegetative stage of the plant growth cycle, while more red light should be introduced during the blooming stage.

To date, agricultural and grow house industries have addressed several ways of reducing energy consumption within grow houses. As the plant growth cycle is dependent upon the amount of visible light energy absorbed by the plants, the present invention is directed to controlling, measuring and monitoring the amount of visible light energy inside grow houses.

Figure 1:
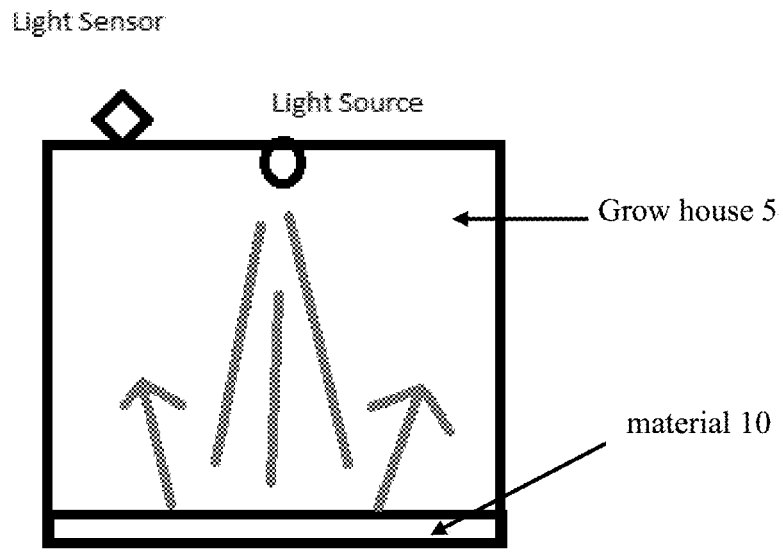
FIG. 1 illustrates an enclosed system for measuring reflected light off high reflective surfaces of the invention.

Referring to FIG. 1, various embodiments of the invention are directed to highly visible-light reflective reactive resinous materials 10 that reside on flooring, ceilings and/or sidewalls inside a grow house 5. In one or more embodiments, systems of the invention comprise contained environments that include one or more light sources, one or more light sensors, and the visible-light reflective materials 20 of the invention residing on flooring, ceilings and/or sidewalls within the contained environment. While not meant to be limiting, the visible-light reflective materials 20 may be applied as coatings over a surface area, such as, a floor, ceiling, sidewalls and/or containers. Alternatively, the visible-light reflective materials 20 may be the floors, ceilings, containers or sidewalls themselves.

In accordance with one or more embodiments, the invention is directed to visible-light reflective materials 20 that comprise two-part reactive (i.e., 2K) or one-part compositions having improved light reflectivity as compared to known two-part and one-part compositions. The visible-light reflective materials 20 of the invention increase light reflectivity of these known compositions by at least 20%. In accordance with the invention, it has now been found that light reflectivity within grow houses has an impact on power consumption. It has also been found that the more reflective light within such grow houses, the less power or energy is consumed and/or needed to run the grow houses.

Currently available high-gloss coatings that are applied to concrete flooring typically include inorganic or organic pigments ranging in amounts from 1 wt. % to 60 wt. %, based on a total weight of the coating composition. For instance, $TiO_2$ is often used as the pigment in such composition coatings. These traditional approaches in paints and coatings utilize TiO2 (white) pigment to reflect all wavelengths of light, however, that is impractical due to cost and formulation limitations.

Figure 2:
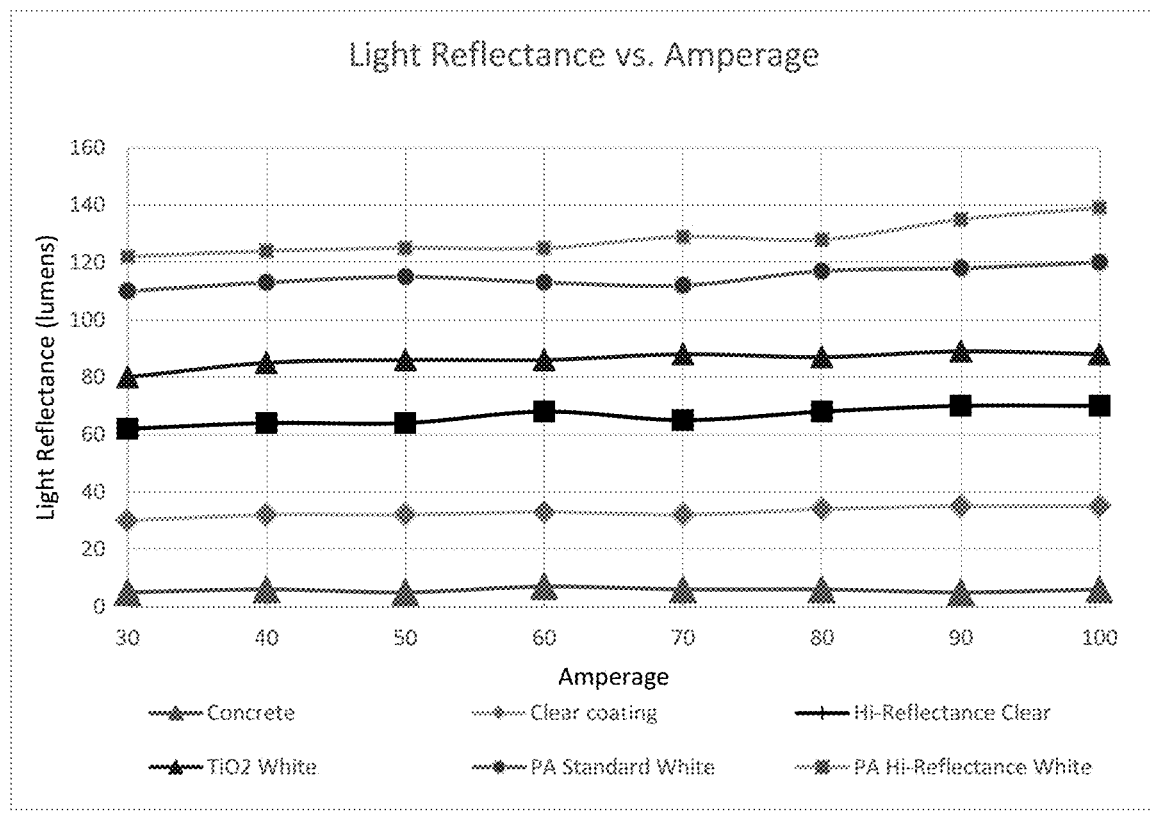
FIG. 2 is a graph depicting light reflectance measures of conventional grow house surfaces.

In accordance with the invention, it has been found that light reflective surfaces (e.g., flooring, walls, ceilings, etc.) provide grow houses with energy consumption reductions, and thereby, cost savings. Referring to FIG. 2, it has now been found that different coating/substrate materials generate different amounts of reflectivity inside grow house 5.

As shown in FIG. 2, in one or more embodiments of the invention a single light source and a single light sensor positioned at the top of the container were used to measure light reflectance for grow house 5. Again, multiple light sources and light sensors may be used in accordance with the invention. Various known and enhanced visible-light reflective materials 20 were measured in accordance with the invention. In doing so, as shown in FIG. 1, when the light source is turned on, light that reflects off the substrate/coated substrate is detected and measured by the light sensor. Conventional grow house substrates include concrete, plywood, tiled flooring, or a concrete/wood substrate coated with a clear or pigmented clear coat having little, to no, reflectance.

Referring to the results of FIG. 2, various known coatings were provided over a 9×9 lab grade concrete block. Prior to coating, the substrates were conditioned in a temperature-controlled room at temperatures ranging from 65° F.-75° F. with relative humidity at 50%±5% for 24 hours. The coatings were provided over the conditioned substrate and allowed to cure up to 28 days.

The various known coatings included a plain concrete substrate, a clear coating over a concrete substrate, a high-reflectance clear coat over a concrete substrate, a $TiO_2$ white coating over a concrete substrate, a polyaspartic (PA) white coating over a concrete substrate, and a polyaspartic (PA) high-reflectance white coating over a concrete substrate. The clear coating was a clear epoxy coating. The high-reflectance clear coat was a clear epoxy coating loaded with retro reflective pigment. The $TiO_2$ white coating was an epoxy coating pigmented with a surface modified $TiO_2$ pigment. The polyaspartic white coating was a polyaspartic white coating with modified $TiO_2$ pigment. The polyaspartic (PA) high-reflectance white coating was a polyaspartic white coating with modified $TiO_2$ pigment and retro reflective microspheres. All coatings were single coats of material with film depth between 13 microns to 15 microns.

In accordance with the invention visible light reflectance values were measured using a system of the invention as shown in FIG. 1, such as a light chamber design. Preferably the light chamber of FIG. 1 is an enclosed environment with as little, to no, background noise as possible. The light source may be a fixed light source, such as an LED light bulb, whereby amperage was controlled and adjusted using a variable transformer to measure the visible light reflectance values using a light sensor, such as a light meter. The light sensor detects and measures the intensity and/or amount of reflected light off the coated surface. The light sensor's readings of lumen (i.e., brightness) may be converted to lumens per amperage, which may be used to calculate cost in dollars.

It should be appreciated that the invention is not limited to measuring amounts of reflective light using light sensors. Various other methods of measuring light are also envisioned within the scope of the present invention. For instance, additional methods may include, but are not limited to, measurement of Photosynthetic Photon Flux Density (PPFD) which calculates how much light, at wavelengths 400 nm-700 nm, will directly reach plant vegetation. Data may be recorded in microeinstein ($\mu E\ m^{-2}\ s^{-1}$) or micromoles ($\mu M\ m^{-2}\ s^{-1}$) units to represent quantum units from a photosynthetically active radiation or PAR meter.

Referring to FIG. 2, in measuring the light intensity of the various known test coatings, it was found that the bare concrete had a negligible light reflectance value, with a marginal increase when the clear coating was provided thereover. The high-reflectance clear coat (i.e., a high-reflectance material added to the clear coat) had an almost 50% increase in light reflectance over the plain clear coat. The increased light reflectance was even more significant for the $TiO_2$ white coating and the polyaspartic white coating. When high-reflectance material was added in accordance with the invention to the polyaspartic white coating, thereby formulating the tested polyaspartic high-reflectance white coating, it was found that this coating had the most significant increase in light reflectance as compared to the bare concrete, and even a 10%-30% increase over the polyaspartic white coating.

Using these formulations, it was found that plant growth was most significantly impacted and improved when grown in an environment having a high visible light reflectance value. That is, the more reflectivity of light off the coated surfaces, the more visible light wavelengths were distributed throughout the grow house. Since plants absorb all wavelengths from the visible light spectrum, in accordance with the invention by increasing the amount of visible light inside the grow house using coatings that have increased visible light reflectance values not only helps plant growth, it also provides a more efficient growing environment leading to less energy consumption due to the increased visible light. That is, less energy is needed to operate such grow houses, thereby leading to cost savings.

In accordance with one or more embodiments, the invention is directed to compositions having increased visible light reflectance that maximize visible light reflectance inside an enclosed environment and provide optimal plant growth conditions, as well as cost savings. The coatings of the invention may include one-part or two-part reactive (i.e., 2K) compositions including, but not limited to, polyurethane, epoxy, polyaspartic, and/or acrylic based resinous systems. In various embodiments, the present compositions may be characterized as emulsion polymerization, catalyst induced, homopolymerization, air cure, and/or moisture cure compositions.

While one or more preferred embodiments of the invention are described herein in relation to increasing reflectivity in indoor grow houses, or other Controlled Environment Agriculture (CEA) applications that increase plant yield, it should be appreciated that the present pre-dispersion high reflectance compositions and resultant high-reflectance/performance resinous coating compositions are suitable for use in any environment in need of increased light reflectivity. For instance, the present pre-dispersion high reflectance compositions may also be used in areas looking to maximize available lighting and increase brightness including, but not limited to, warehouses, parking garages, stairwells, hallways, packaging rooms, extraction and processing areas, utility and maintenance areas, shipping and warehouses, offices, retail spaces, showrooms, restrooms and locker rooms, etc. When used to increase reflectance in indoor growing environments, the present pre-dispersion high reflectance compositions may be used in grow rooms, indoor farming, vertical farms, container farms, hydroponic and aquaponic farms, aeroponic farms, greenhouses, mother and cloning rooms, vegetative rooms, flowering rooms, drying and trim rooms, etc.

The pre-dispersion high reflectance compositions of the invention are mixed with one-part or two-part epoxy or polyaspartic coating composition(s) to render a high-performance resinous coating composition that maximizes light reflectance, particularly in indoor agricultural growing environments. This increased light reflectance maximizes energy efficiency by decreasing energy usage and need for artificial lighting, as well as decreases costs, while providing a hygienic, easy to clean environment that promotes healthy plant growth and increases crop production and yields. In one or more embodiments the present high-performance resinous coating compositions of the invention may increase photosynthetic active radiation (PAR) reflectance of floor and walls by up to 56 percent, which effectively increases the amount of light available for photosynthesis.

The resultant high-performance resinous coating systems/compositions of the invention are suitable for application to vertical and/or horizontal surfaces, and may be applied to any substrate, such as, flooring, walls, ceilings, concrete, steel, tile, concrete masonry unit (CMU) walls, plywood, drywall, wall boards, etc., or any combination thereof. The present high-performance resinous coatings may be applied as a single coating layer or multiple coating layers.

In one or more embodiments the coatings are applied as both a full floor and full wall coatings, as well as optionally on ceilings, furniture, and/or grow containers, to increase surface area light reflectance by providing reflectance throughout the entire room/area. In doing so, the entirely coated surface areas provide a high distribution of visible light reflectivity within the targeted area, thereby allowing for an increase in light consumption for collection and/or plant absorption. This high distribution of visible reflective light in the target area also decreases energy consumption and costs, making the plant/crop growth more profitable. In one or more embodiments the invention maximizes available light by increasing surface reflectivity up to 21 times the reflectivity of traditional concrete floors.

The pre-dispersion high reflectance compositions of the invention provide resultant high-performance resinous coatings that are highly chemical resistant, abrasion resistant, and impact resistant, all of which allow the coated surfaces to be able to withstand chemicals from washdown and fertilizers. The resultant high-performance resinous coatings are applied as a seamless coating that has a rapid cure time allowing for a quick return to service minimizing facility/room downtime and interruption to enable a fast return or start to crop growing yielding higher productivity. Due to the seamless application, the high-performance resinous coatings of the invention are easily cleaned and maintained, as well as being more hygienic allowing for lower maintenance costs.

Referring to the various embodiments of the invention, in one or more embodiments the invention is directed to pre-dispersion high reflectance compositions that include an epoxy resin or secondary diamine resin, zinc oxide, one or more filler(s), and retroreflective microspheres. These materials are mixed in a pre-dispersion that is added to pigmented or clear epoxy or polyaspartic coating systems. For instance, the pre-dispersion high reflectance compositions of the invention may be added to one-part or two-part compositions that may or may not include $TiO_2$ as a pigmenting agent.

In one or more embodiments, the high reflectance pre-dispersion compositions include an epoxy resin, zinc oxide, one or more filler(s), and retroreflective microspheres. The epoxy resin may be characterized as having an epoxide equivalent weight (g/eq) higher than 20 and lower than 1150, an epoxide amount of 50 percent or less, and a viscosity of 14000 mPas or less. In other embodiments the high reflectance compositions include a secondary diamine resin, zinc oxide, one or more filler(s), and retroreflective microspheres. The secondary diamine resin may be characterized as having an amine equivalent weight greater than 250 and less than 550, and a viscosity greater than 50 cPs and less than 1500 cPs.

Suitable retroreflective microspheres of the invention are those that reflect the full visible light spectrum, and preferably only the visible light spectrum. Preferred retroreflective microspheres are those that reflect the visible spectrum from all light sources in the 400 nm to 700 nm wavelength ranges. In doing so, the invention increases lighting levels for various cycles of plant growth. Also, the high reflectance pre-dispersion compositions of the invention may be tailored to increase reflectance, and hence lighting levels, at certain wavelengths.

For instance, certain pre-dispersion compositions of the invention may increase reflectance at the 350 nm-500 nm wavelength range (i.e., blue light) which is suitable for use with the vegetative state growth of a plant. Similarly, other pre-dispersion compositions of the invention may increase reflectance at the 600 nm-750 nm wavelength range (i.e., red light) which is useful in the fruit or flowering stage of the plant. It should be appreciated that while one or more preferred embodiments of the invention are directed to increasing light reflectance in the visible light spectrum, the increasing of all light spectrums is envisioned and encompassed by the invention through use of suitable retroreflective microspheres.

The retroreflective microspheres may include a variety of different reflective materials including, but not limited to, retroreflective microspheres, reflective glass microspheres, reflective fillers, and reflective inorganic powders. In one or more embodiments, the retroreflective microspheres may have particle sizes ranging from about 3 microns to about 1,000 microns. In one or more preferred embodiments, the retroreflective microspheres may have particle sizes ranging from 40-50 microns.

For instance, in one or more embodiments, the retroreflective microspheres may include, but is not limited to, soda lime glass or barium titanate glass having a purity ranging from about 80% to 100%. These retroreflective microspheres may either be untreated or treated with a surfactant(s). For instance, retroreflective microspheres of soda lime glass or barium titanate glass may be treated with a silane-based coatings, fluorochemical surfactant. These treated retroreflective microspheres may comprise ≤1.5% of the microspheres based on a total percent weight of such microspheres. The index of refraction must be <1.0.

The total amount of high reflectance materials that may be added in accordance with the invention may be 0.10%-60.00% (w/w %), and preferably from 0.50%-25% (w/w %). It has been found in certain embodiments that the preferred range of high reflectance materials in coatings for horizontal coating applications (e.g., flooring) range from 5.00%-15.00% (w/w %), while vertical coating applications (e.g., walls) range from 2.00%-20.00% (w/w %). All percentages by weight are based on total weight of resin solids in the resultant high reflectance composition.

The filler(s) may include, but are not limited to, calcium carbonate, talc, kaolinite calcined, barium sulfate, aluminum stearate, diatomaceous earth, wollastonite, nepheline syenite, or any combination thereof.

In accordance with one or more embodiments, the present high reflectance pre-dispersion compositions of the invention may comprise epoxy resin in an amount of 10-50 wt. %, zinc oxide in an amount of 20-50 wt. %, one or more filler(s) in an amount of 1-20 wt. %, and retroreflective microsphere in an amount of 5-50 wt. %. Alternatively, the present high reflectance pre-dispersion compositions may comprise secondary diamine resin in an amount of 10-50 wt. %, zinc oxide in an amount of 20-50 wt. %, one or more filler(s) described above in an amount of 1-20 wt. %, and retroreflective microspheres in an amount of 5-50 wt. %. As described herein, weight percentages are based on weight of resin solids in the resultant high reflectance composition. The above constituent materials are mixed in a pre-dispersion that is added to pigmented or clear reactive coating systems (e.g., polyaspartic coating systems/compositions).

These various high reflectance pre-dispersion compositions of the invention are then mixed with one-part or two-part reactive compositions to render a final resinous coating having high reflectance properties that provide an increased amount of reflective light within a grow house. As used herein, the term high reflectance, as applied to the coatings industry, refers to the brightness of a coated substrate. A coating or coated substrate referred to as "high reflectance" is visually brighter as a result of higher light reflectance. The final resinous coatings of the invention may have formulations including, but not limited to, the following:

| Final Resinous Coating Components | Total weight percent* | Preferred total weight percent* | Most Preferred total weight percent* |
|---|---|---|---|
| total amount of Resin (secondary diamine or epoxy) | 20-89% | 40-70% | 30-60% |
| total amount of Zinc Oxide | 1-50% | 5-45% | 25-40% |
| total amount of filler(s) | 1-20% | 1-20% | 2-10% |
| total amount of retroreflective microspheres | 5-50% | 5-50% | 5-30% |
| total amount of additive(s) | 0.5-3% | 0.5-1% | 0.5-1% |

*based on a total weight percentage (i.e., 100%) of the final high reflectance resinous coating.

For instance, while not meant to be limiting, Example 1 in Table 1 below is an exemplary embodiment of the invention. In the high reflectance pre-dispersion compositions of the invention it is preferred that all three constituents zinc oxide, one or more fillers, and retroreflective microspheres reside in the composition in combination with a resin material. In the pre-dispersion compositions of the invention, the resin component (i.e., either an epoxy resin or secondary diamine resin) is mixed with (A) zinc oxide in an amount of 20%-70%, (B) one or more fillers in an amount of 10%-40%, and (C) retroreflective microspheres in an amount of 20%-70%, wherein the percentages of constituents (A)-(C) are based on a ratio of 100% of such combination.

Referring to the below Table 1, exemplary embodiment Example 1 was tested and compared to compositions not including one of the above essential constituents (A)-(C) for optimal performance. In particular, Example 1 includes the resin component, being an epoxy resin, mixed with the combination of constituents (A)-(C). The combination of (A)-(C) included (A) 40% zinc oxide, (B) 20% filler(s), and (C) 20% retroreflective microspheres, based on the total combination wt % of (A)-(C).

The mixed combination of constituents (A)-(C) was combined with 80 wt % epoxy resin component to render the high reflectance pre-dispersion composition Example 1 of the invention. In particular, 80 wt % epoxy resin, 10 wt % zinc oxide, 5 wt % filler(s), and 5 wt % retroreflective microspheres, with percentages being based on total resin weights, were combined to render the pre-dispersion composition.

Examples 2-3 were provided in a similar manner, however, these Examples 2-3 each omitted one of the constituents (A)-(C). In particular, Example 2 omits zinc oxide, Example 3 omits the one or more fillers, and Example 4 omits the retroreflective microspheres. Control Example 5 is a composition of the prior art including the resin component mixed only with fill and a TiO2 (white) pigment for reflectance, which is an industry standard for a grow room coating. The various amounts of each above constituent are displayed in Table 1, and measured reflectance results shown in Table 2 below. The various amounts of each above constituent are displayed in Table 1, and measured reflectance results detailed in Table 2 below, which shows the Example 1 of the invention providing superior light reflectance as compared to the compositions of Examples 2-5.

Table 1 showing exemplary high reflectance pre-dispersion composition Example 1 of the invention. The various exemplary compositions depicted below in Examples 1-5 are mixed with a one-part reactive composition to render final high-reflectance reactive resin/resinous coating compositions that were tested.

| | Resin (epoxy resin or secondary diamine resin) | (A) Zinc Oxide | (B) Filler(s) | (C) Retroreflective Microspheres | Titanium Dioxide Pigment |
|---|---|---|---|---|---|
| Example 1 | 80% | 10% | 5% | 5% | 0% |
| Example 2 | 83.33% | 0% | 8.33% | 8.33% | 0% |
| Example 3 | 81.66% | 11.66% | 0% | 6.66% | 0% |
| Example 4 | 81.66% | 11.66% | 6.66% | 0% | 0% |
| Example 5 | 80% | 0% | 10% | 0% | 10% |

*wherein all measures are based on weight percentage (wt %) of the total composition for each example.

Table 2 below shows the results of contrast ratio, whiteness index, light reflectance, and PAR values for test Examples 1-5 above. As shown, it has been found the high reflectance coating compositions of the invention including each a resin, zinc oxide, filler, and retroreflective microspheres performed the best and resulted in the highest amount of light reflectance off of its reflective surface.

Example 1 of the invention demonstrates that the combination of all three components (i.e., filler, zinc oxide and retroreflective microspheres) in combination with the resin component are preferred to achieve optimal results (i.e., optimal light reflectance, best light reflectance from a floor coating in a grow room, and light density landing on the plant within a grow house). This high reflectance pre-dispersion composition of the invention may be used to provide optimal value light reflectance in interior systems for agriculture growth or lower the power consumption necessary to illuminate (light) a room. The results also show that in Examples 2-4, PAR density and light reflectance may be improved with addition of some constituents of the instant high-reflectance pre-dispersions.

Table 2 showing Examples 1-5 of Table 1 mixed with a one-part reactive coating composition to render final resinous coatings having the following attributes:

|  | Contrast Ratio | Whiteness Index | Light Reflectance (Lumens) | PAR Value ($\mu mol/m^{-2s}$) |
| --- | --- | --- | --- | --- |
| Example 1 | 96 | 98 | 198 | 12.2 |
| Example 2 | 93 | 95 | 149 | 8.2 |
| Example 3 | 93 | 94 | 160 | 9.4 |
| Example 4 | 94 | 95 | 165 | 8.3 |
| Example 5 | 92 | 94 | 126 | 7.8 |

Figure 3:
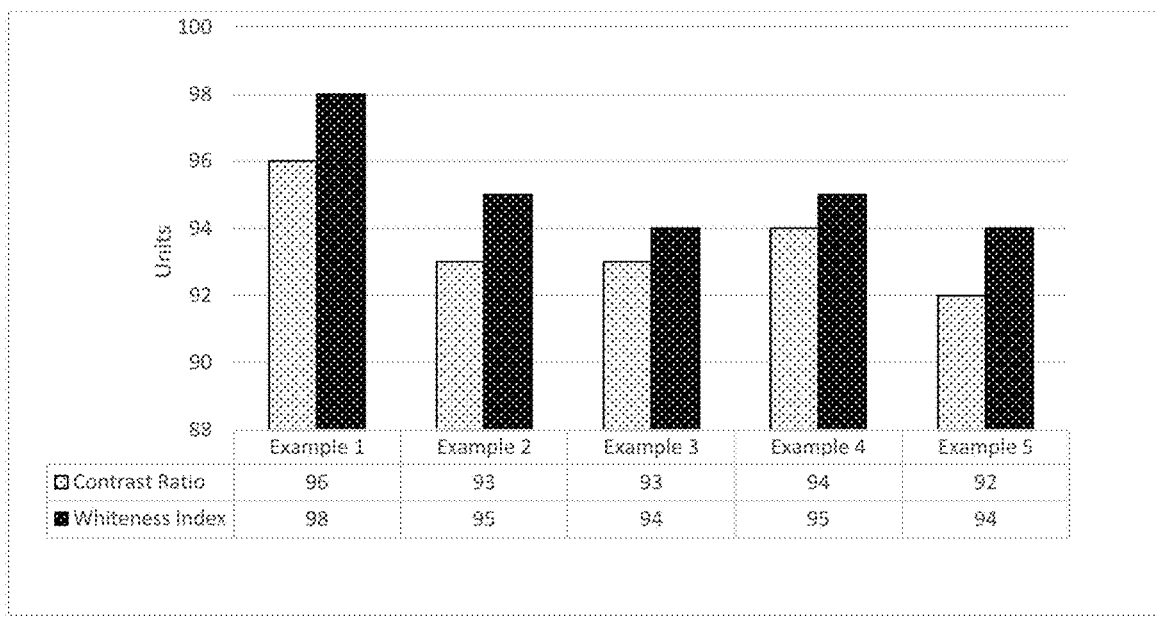
FIG. 3 is a comparative chart showing contrast ratio and whiteness indexes of the compositions of the invention as compared to known compositions.
Figure 4:
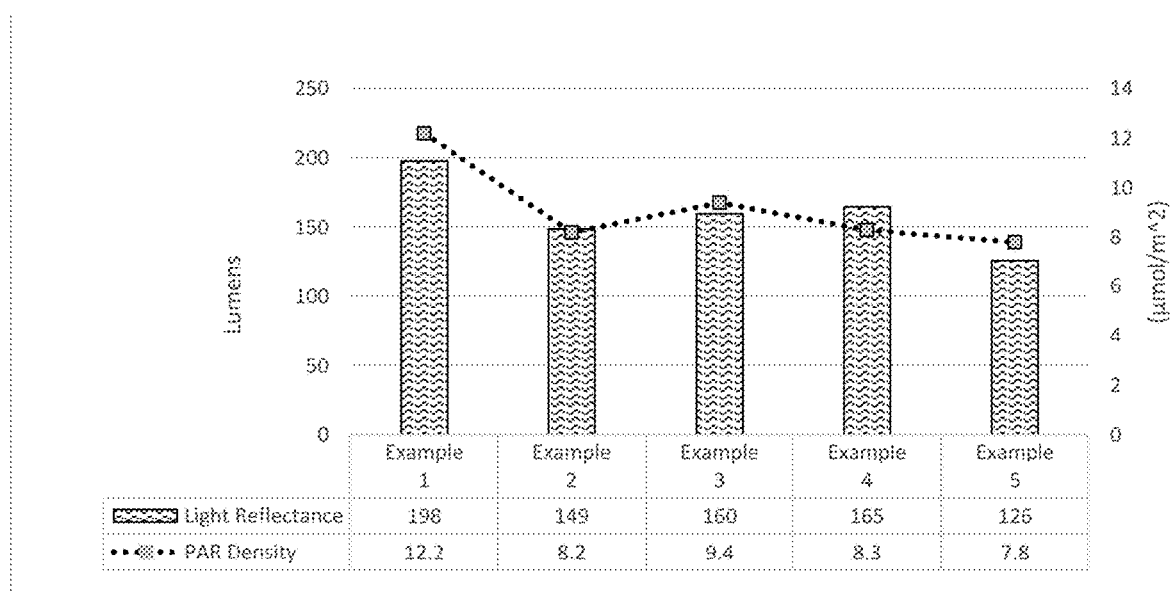
FIG. 4 is a comparative graph depicting lumens and PAR density of the compositions of the invention as compared to known compositions.

Referring to FIGS. 3 and 4 respectively, Example 1 of the invention exhibits enhanced whiteness index and contrast ratio and superior light reflectance and PAR density over comparative Examples 2-5. In one or more embodiments, fillers and retroreflective microspheres may be selected to target wavelengths in the visible spectrum (380-740 nm) with potential to reflect the IR spectrum and serve as a heat reflective coating. The fillers and retroreflective microspheres may also be selected to reflect off the various color spectrums within the visible light spectrum. For instance, one or more fillers and/or retroreflective microspheres may be included within the high reflectance coating compositions of the invention that have a high affinity to the blue light and/or red light spectrums to enhance plant growth.

Figure 5:
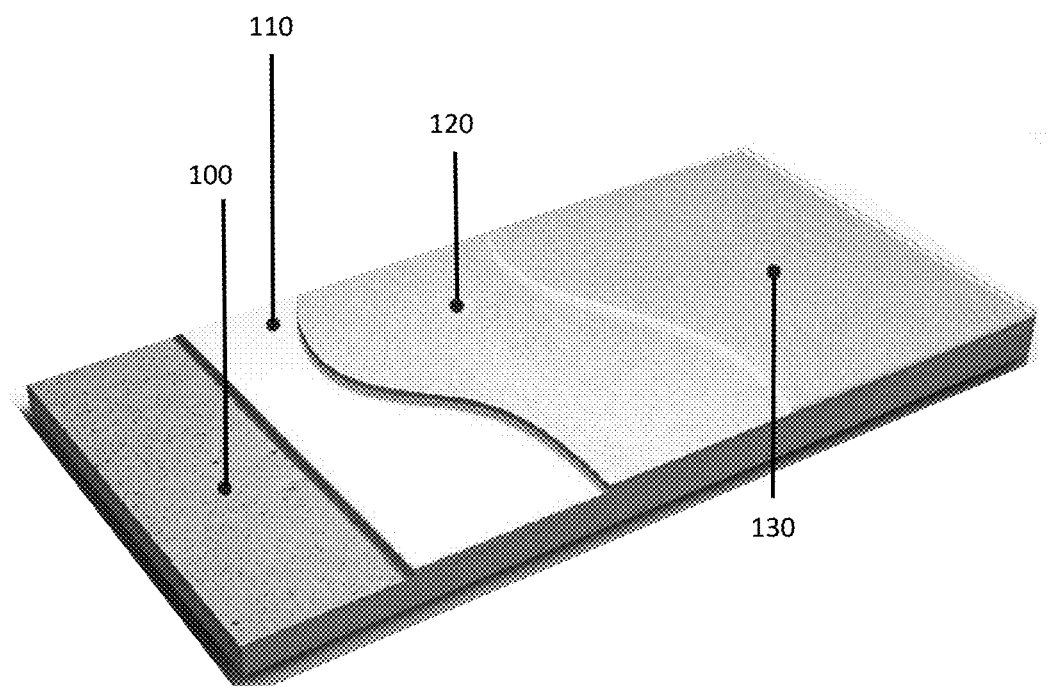
FIG. 5 illustrates a high-performance resinous coating of the invention and resultant high reflective system of the invention.

Referring to FIG. 5, a completed structure of the invention is shown having a high-reflectance reactive resin coating composition layer 120 of the invention. In applying the compositions of the invention, a substrate 100 is provided and cleaned or prepared for subsequent layering. One or more epoxy or polyaspartic coatings 110 (e.g., a two-part polyaspartic aliphatic polyurea) may optionally be provided over the prepared substrate for sealing/finishing, providing decorative details, or providing protection to the substrate. The pre-dispersion composition of the invention (Part A) is then mixed with a reactive coating composition (Part B), such as, for instance an epoxy or polyaspartic coating compositions such as that used in layering 110, to render a high-reflectance reactive resin coating 120 of the invention. In one or more embodiments the pre-dispersion composition (Part A) is mixed with the reactive coating composition (Part B) in a ratio of 1.3 parts (Part A) to 1 part (Part B). Optionally, an anti-microbial topcoat 130 may be deposited over the high-reflectance reactive resin coating 120 to reduce the risk of bacterial, mold and fungi accumulations and minimizes the risk of damage to crops.

While not meant to be limiting, in one or more embodiments the pre-dispersion composition (Part A) may be composed of DL-Aspartic acid, N,N'-(methylenedi-4,1-cyclohexanediyl)bis-, tetraethyl ester (in an amount of about 22-29 weight by weight percentage (w/w %)), zinc oxide (ZnO) (in an amount of about 15-40 w/w %), carbonic acid, calcium salt (1:1) (in an amount of about 7-13 w/w %), aspartic acid, N,N'-[methylenebis(2-methyl-4,1-cyclohexanediyl)]bis-, tetraethyl ester (in an amount of about 8-10 w/w %), glass, oxide, chemicals (in an amount of about 5-10 w/w %), fumaric acid, diethyl ester (in an amount of about 1-2 w/w %), poly(oxy-1,2-ethanediyl), .alpha.-[3-[3-(2H-benzotriazol-2-yl)-5-(1,1-dimethylethyl)-4-hydroxyphenyl]-1-oxopropyl]-.omega.-[3-[3-(2Hbenzotriazol-2-yl)-5-(1,1-dimethylethyl)-4-hydroxyphenyl]-1-oxopropoxy]- (in an amount of about 0.1-0.2 w/w %), poly(oxy-1,2-ethanediyl), .alpha.-[3-[3-(2H-benzotriazol-2-yl)-5-(1,1-dimethylethyl)-4-hydroxyphenyl]-1-oxopropyl]-.omega.-hydroxy- (in an amount of about 0.1-0.2 w/w %), bis(1,2,2,6,6-pentamethyl-4-piperidyl) sebacate (in an amount of about 0.15-0.2 w/w %), and/or decanedioic acid, methyl 1,2,2,6,6-pentamethyl-4-piperidinyl ester (in an amount of about 0.05-0.1 w/w %), in various combinations thereof.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of increasing visible light in a grow house, comprising:
   providing a pre-dispersion composition comprising a resin, zinc oxide, one or more fillers, and retroreflective microspheres;
   mixing the pre-dispersion composition with a reactive coating composition to provide a high-reflectance reactive resin coating composition;
   depositing the high-reflectance reactive resin coating composition over a substrate inside the grow house;
   allowing the deposited high-reflectance reactive resin coating composition to cure to provide a cured high-reflectance reactive resin layer over the substrate, whereby the cured high-reflectance reactive resin layer has a light reflectance increase up to 60% in lumens as compared to a cured layer of the reactive coating composition alone;
   reflecting light from a light source off the cured high-reflectance reactive resin layer to increase an amount of visible light inside the grow house.

2. The method of claim 1 wherein the pre-dispersion composition comprises:
   the resin in an amount of 10-50 wt. %;
   the zinc oxide in an amount of 20-50 wt. %;
   the one or more fillers in an amount of 1-20 wt. %; and
   the retroreflective microspheres in an amount of 5-50 wt. %.

3. The method of claim 1 wherein the high-reflectance reactive resin coating composition comprises:
   a total amount of resin comprising 20-89 wt. % resin;
   a total amount of zinc oxide comprising 1-50 wt. % zinc oxide;
   a total amount of one or more fillers comprising 1-20 wt. % one or more fillers; and
   a total amount of retroreflective microspheres comprising 5-50 wt. % retroreflective microspheres, said weight percentages are based on weight of resin solids in the cured high-reflectance reactive resin layer.

4. The method of claim 3 wherein the high-reflectance reactive resin coating composition comprises:
a total amount of resin comprising 30-60 wt. % resin;
a total amount of zinc oxide comprising 25-40 wt. % zinc oxide;
a total amount of one or more fillers comprising 2-10 wt. % one or more fillers; and
a total amount of retroreflective microspheres comprising 5-30 wt. % retroreflective microspheres, said weight percentages are based on weight of resin solids in the cured high-reflectance reactive resin layer.

5. The method of claim 3 wherein the high-reflectance reactive resin coating composition further comprises one or more additives in a total amount of 0.5-3 wt. % additives.

6. The method of claim 1 wherein the resin comprises an epoxy resin and the pre-dispersion composition comprises an epoxy resin pre-dispersion, the method further including mixing the epoxy resin pre-dispersion with the reactive coating composition comprising a clear or pigmented epoxy coating composition.

7. The method of claim 6 wherein the epoxy resin has an epoxide equivalent weight (g/eq) higher than 20 and lower than 1150, an epoxide amount of 50 percent or less, and a viscosity of 14000 mPas or less.

8. The method of claim 1 wherein the resin comprises a secondary diamine resin and the pre-dispersion composition comprises a secondary diamine resin pre-dispersion, the method further including mixing the secondary diamine resin pre-dispersion with the reactive coating composition comprising a clear or pigmented polyaspartic coating composition.

9. The method of claim 8 wherein the secondary diamine resin has an amine equivalent weight greater than 250 and less than 550, and a viscosity greater than 50 cPs and less than 1500 cPs.

10. The method of claim 1 wherein the retroreflective microspheres are selected from the group consisting of soda lime glass or barium titanate glass.

11. The method of claim 10 wherein the retroreflective microspheres have a particle size ranging from about 3 microns to 100 microns.

12. The method of claim 10 wherein the retroreflective microspheres are treated with a surfactant.

13. The method of claim 1 wherein the substrate is selected from the group consisting of a horizontal substrate surface, a vertical substrate surface, or both horizontal and vertical substrate surfaces.

14. The method of claim 1 wherein the substrate is a flooring, a wall, a ceiling, or any combination thereof.

15. A method of increasing visible light in a grow house, comprising:
providing a high-reflectance reactive resin coating composition comprising,
a total amount of resin comprising 40-89 wt. % resin,
a total amount of zinc oxide comprising 5-20 wt. % zinc oxide,
a total amount of one or more fillers comprising 1-20 wt. % one or more fillers,
a total amount of retroreflective microspheres comprising 5-50 wt. % retroreflective microspheres, said weight percentages are based on weight of resin solids in the high-reflectance reactive resin coating composition;
depositing the high-reflectance reactive resin coating composition over a substrate inside the grow house;
allowing the deposited high-reflectance reactive resin coating composition to cure to provide a cured high-reflectance reactive resin layer over the substrate; and
reflecting light from a light source off the cured high-reflectance reactive resin layer to increase an amount of visible light at 350 nm-750 nm wavelengths inside the grow house.

16. The method of claim 15 wherein the cured high-reflectance reactive resin layer has a light reflectance increase of 60% in lumens inside the grow house.

17. The method of claim 15 wherein the high-reflectance reactive resin coating composition is formulated by mixing a pre-dispersion including a resin, zinc oxide, one or more fillers, and retroreflective microspheres with a reactive resin coating composition.

18. The method of claim 15 wherein the pre-dispersion includes the resin in an amount of 10-50 wt. %, the zinc oxide in an amount of 20-50 wt. %, the one or more fillers in an amount of 5-20 wt. % and the retroreflective microspheres in an amount of 5-50 wt. %.

19. The method of claim 15 wherein the reactive resin coating composition comprises a one-part or two-part reactive resin coating system.

20. A high-reflectance reactive resin coating composition for use inside a grow house, comprising:
a pre-dispersion composition mixed with a reactive coating composition, the pre-dispersion composition comprising,
a total amount of resin comprising 40-89 wt. % resin;
a total amount of zinc oxide comprising 5-20 wt. % zinc oxide;
a total amount of one or more fillers comprising 1-20 wt. % one or more fillers; and
a total amount of retroreflective microspheres comprising 5-50 wt. % retroreflective microspheres, said weight percentages are based on weight of resin solids in the high-reflectance reactive resin coating composition;
wherein at least one or more layers of said high-reflectance reactive resin coating composition are coated onto a substrate and cured to form a cured high reflectance coating composition having a light reflectance increase up to 60% lumens increasing an amount of visible light inside the grow house to enhance plant growth.

* * * * *